(12) United States Patent
Zhong et al.

(10) Patent No.: US 11,797,060 B2
(45) Date of Patent: Oct. 24, 2023

(54) ELECTRONIC DEVICE AND PIVOT STRUCTURE THEREOF

(71) Applicant: ASUSTeK COMPUTER INC., Taipei (TW)

(72) Inventors: Xian Zhong, Taipei (TW); Shih-Wei Chiu, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 17/328,848

(22) Filed: May 24, 2021

(65) Prior Publication Data

US 2021/0373613 A1    Dec. 2, 2021

(30) Foreign Application Priority Data

May 29, 2020   (TW) ................................. 109206764

(51) Int. Cl.
*G06F 1/16*    (2006.01)
*G06F 1/20*    (2006.01)

(52) U.S. Cl.
CPC ............ *G06F 1/1681* (2013.01); *G06F 1/203* (2013.01)

(58) Field of Classification Search
CPC ....... G06F 1/1681; G06F 1/203; G06F 1/1616
See application file for complete search history.

(56) References Cited

U.S. PATENT DOCUMENTS

| | | | | |
|---|---|---|---|---|
| 6,053,589 A * | 4/2000 | Lin | ....................... | G06F 1/1616 312/271 |
| 6,097,595 A * | 8/2000 | Cipolla | ................... | G06F 1/166 248/688 |
| 6,961,240 B2 * | 11/2005 | Janicek | ................ | H05K 5/0226 220/241 |
| 7,679,905 B2 * | 3/2010 | Wu | ......................... | G06F 1/166 248/500 |
| 7,813,122 B2 * | 10/2010 | Wang | ...................... | G06F 1/203 361/679.55 |
| 8,693,181 B2 * | 4/2014 | Tseng | .................... | G06F 1/1635 361/679.28 |

(Continued)

FOREIGN PATENT DOCUMENTS

CN   102235421 A   11/2011
CN   109582093 A   4/2019

*Primary Examiner* — Anthony M Haughton
*Assistant Examiner* — Theron S Milliser
(74) *Attorney, Agent, or Firm* — McClure, Qualey & Rodack, LLP

(57) ABSTRACT

An electronic device is provided, which includes a first body, a second body, and a pivot structure connecting the first body and the second body. The pivot structure includes a shaft with an axis, a first assembling element assembled with the shaft and connected with the first body and a second assembling element pivotally connected to the shaft and connected with the second body. The second assembling element includes an abutting portion. When at the first position, the abutting portion and the first assembling element are located on the same side relative to the axis. When at the second position, the abutting portion rotates around the axis and is located on a different side relative to the axis, and the abutting portion abuts the abutting surface to generate an abutting force. Then the first body rises and an angle relative to the abutting surface is generated.

11 Claims, 10 Drawing Sheets

(56) References Cited

U.S. PATENT DOCUMENTS

| | | | | |
|---|---|---|---|---|
| 8,891,231 B2* | 11/2014 | Okuley | ............... | G06F 1/1662 |
| | | | | 318/400.26 |
| 9,507,376 B2* | 11/2016 | Kontkanen | ........... | G06F 1/1624 |
| 9,519,309 B2* | 12/2016 | Okuley | ............... | G06F 1/1637 |
| 9,727,091 B2* | 8/2017 | Chen | ................. | G06F 1/1643 |
| 10,120,412 B2* | 11/2018 | Chen | ................. | G06F 1/1681 |
| 10,599,179 B2* | 3/2020 | Okuley | ............... | G06F 1/1616 |
| 10,824,191 B2* | 11/2020 | Okuley | ............... | G06F 1/1681 |
| 2005/0024822 A1* | 2/2005 | Janicek | ............... | H05K 5/0226 |
| | | | | 361/679.46 |
| 2008/0283711 A1* | 11/2008 | Wu | ..................... | G06F 1/166 |
| | | | | 248/372.1 |
| 2009/0237878 A1* | 9/2009 | Chen | ................. | G06F 1/1656 |
| | | | | 361/679.55 |
| 2010/0118481 A1* | 5/2010 | Wang | ................. | G06F 1/166 |
| | | | | 361/679.27 |
| 2011/0292605 A1* | 12/2011 | Chen | ................. | G06F 1/1616 |
| | | | | 16/303 |
| 2012/0162871 A1* | 6/2012 | Tseng | ................ | G06F 1/1635 |
| | | | | 361/679.01 |
| 2013/0155598 A1* | 6/2013 | Kontkanen | ......... | H04M 1/0216 |
| | | | | 361/679.27 |
| 2014/0029187 A1* | 1/2014 | Okuley | ............... | G06F 1/1662 |
| | | | | 361/679.55 |
| 2015/0124389 A1* | 5/2015 | Okuley | ............... | G06F 1/1637 |
| | | | | 361/679.55 |
| 2017/0139439 A1* | 5/2017 | Okuley | ................. | G06F 1/169 |
| 2020/0142444 A1* | 5/2020 | Okuley | ................. | G06F 1/1616 |
| 2021/0149443 A1* | 5/2021 | Okuley | ................. | G06F 1/169 |

* cited by examiner

ELECTRONIC DEVICE AND PIVOT STRUCTURE THEREOF

CROSS-REFERENCE TO RELATED APPLICATION

This application claims the priority benefit of Taiwan application serial No. 109206764, filed on May 29, 2020. The entirety of the above-mentioned patent application is hereby incorporated by reference herein and made a part of specification.

BACKGROUND OF THE INVENTION

Field of the Invention

The disclosure relates to a pivot structure.

Description of the Related Art

An electronic device, such as a laptop, is often placed on a surface to facilitate user operation. During the electronic device works, the electronic device generates heat from the internal components. When the electronic device is operated and closely disposed to the abutting surface in a large area, it is not conducive to the heat dissipation of the electronic device, and it affects the performance of the operation. Therefore, electronic devices are often equipped with external heat dissipation modules to achieve a good heat dissipation effect, which needs additional space and increases the limitation of structural configuration.

BRIEF SUMMARY OF THE INVENTION

An electronic device is provided, which includes a first body, a second body, and a pivot structure. The pivot structure connects the first body and the second body and configures the first body and the second body to rotate relatively between the first position and the second position. The pivot structure includes a shaft, a first assembling element and a second assembling element. The shaft includes an axis.

The first assembling element is assembled with the shaft and connected with the first body. The second assembling element is pivotally connected to the shaft and connected with the second body. The second assembling element includes an abutting portion.

In an embodiment, at the first position, the abutting portion and the first assembling element are located on the same side relative to the axis, and a bottom portion of the first body is parallel to an abutting surface. At the second position, the abutting portion rotates around the axis and is located on a different side relative to the axis from the first assembling element, and the abutting portion abuts the abutting surface to generate an abutting force. Then the first body rises and an angle relative to the abutting surface is generated.

A pivot structure suitable for an electronic device is provided. The electronic device includes a first body and a second body. The first body and the second body rotate between a first position and a second position through the pivot structure. The pivot structure includes a shaft, a first assembling element and a second assembling element. The shaft includes an axis.

The first assembling element is assembled with the shaft and connected with the first body. The second assembling element is pivotally connected to the shaft and connected with the second body. The second assembling element includes an abutting portion.

When at the first position, the abutting portion and the first assembling element are located on the same side relative to the axis, and a bottom portion of the first body is parallel to an abutting surface. When at the second position, the abutting portion rotates around the axis and is located on a different side relative to the axis from the first assembling element, and the abutting portion abuts the abutting surface to generate an abutting force, which makes the first body rise and generate an angle relative to the abutting surface.

DETAILED DESCRIPTION OF THE EMBODIMENTS

Figure 1:
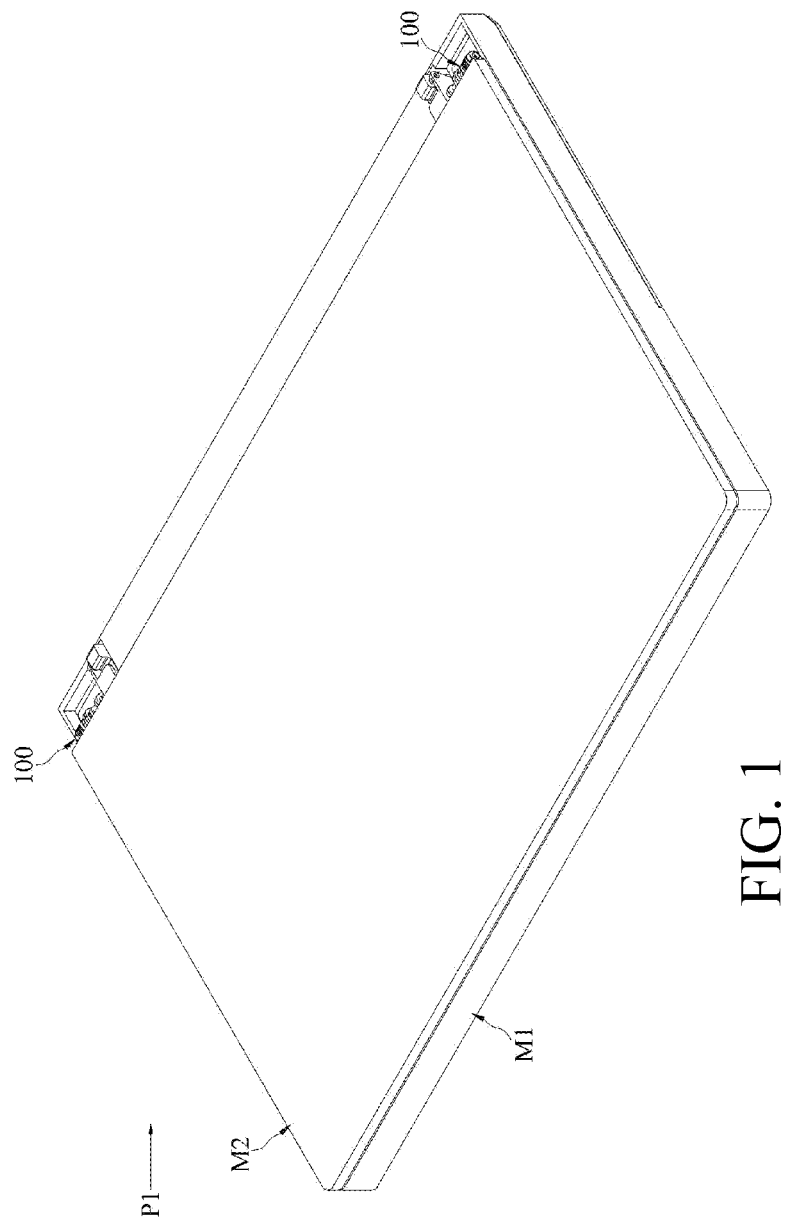
FIG. 1 is a three-dimensional external view showing an electronic device in a first position in an embodiment.

Please refer to FIG. 1. FIG. 1 is a three-dimensional external view showing an electronic device in a first position P1 in an embodiment. The electronic device is a notebook computer, a display panel, a speaker, a playback media device, or other output/input device, which is not limited herein.

Please refer to FIG. 1. The electronic device includes a pivot structure 100, a first body M1 and a second body M2. The pivot structure 100 is disposed between the first body M1 and the second body M2, which allows the first body M1 and the second body M2 to rotate relatively to open and close between the first position P1 and the second position P2 through the pivot structure 100.

Figure 2:
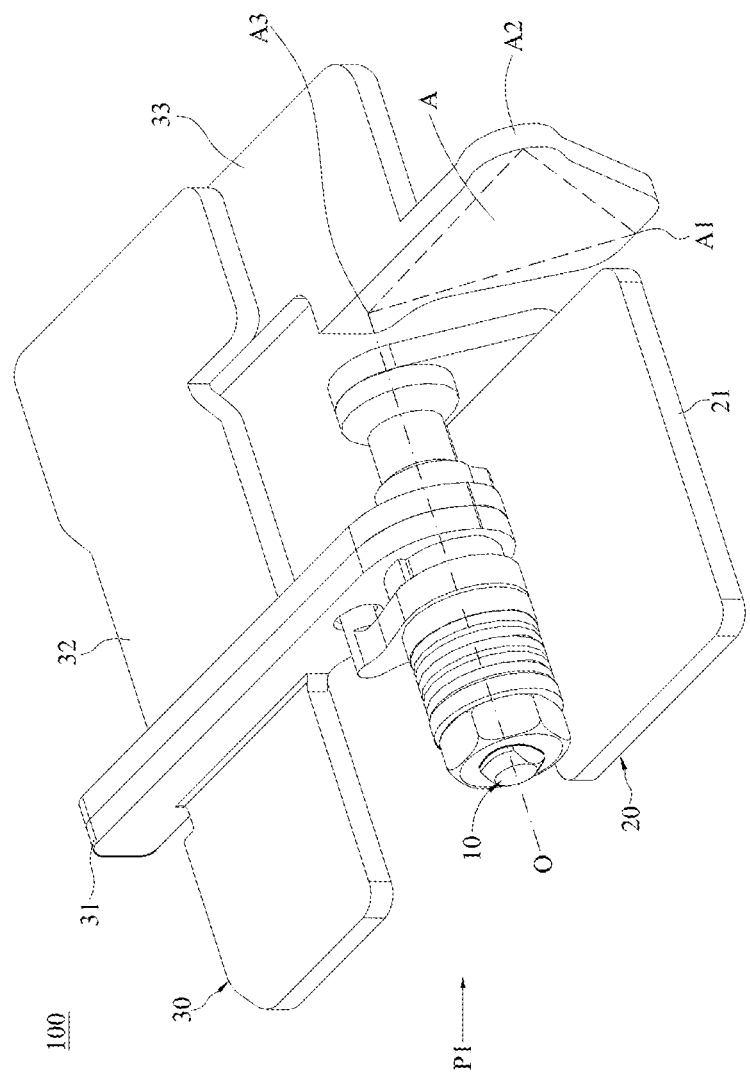
FIG. 2 is a three-dimensional schematic diagram showing a pivot structure of an electronic device in an embodiment.
Figure 3:
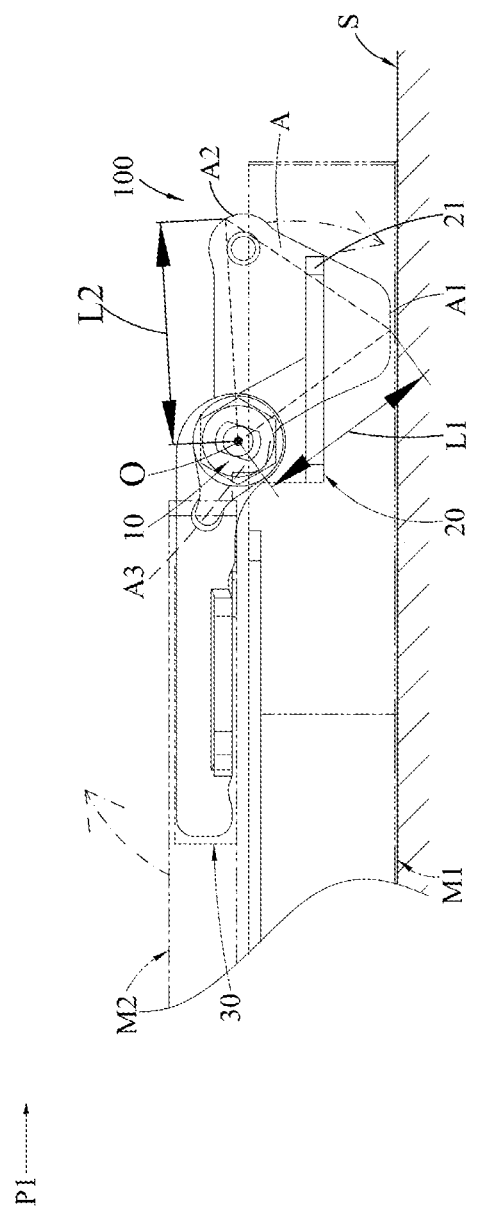
FIG. 3 is a side view showing an electronic device in an embodiment.
Figure 4:
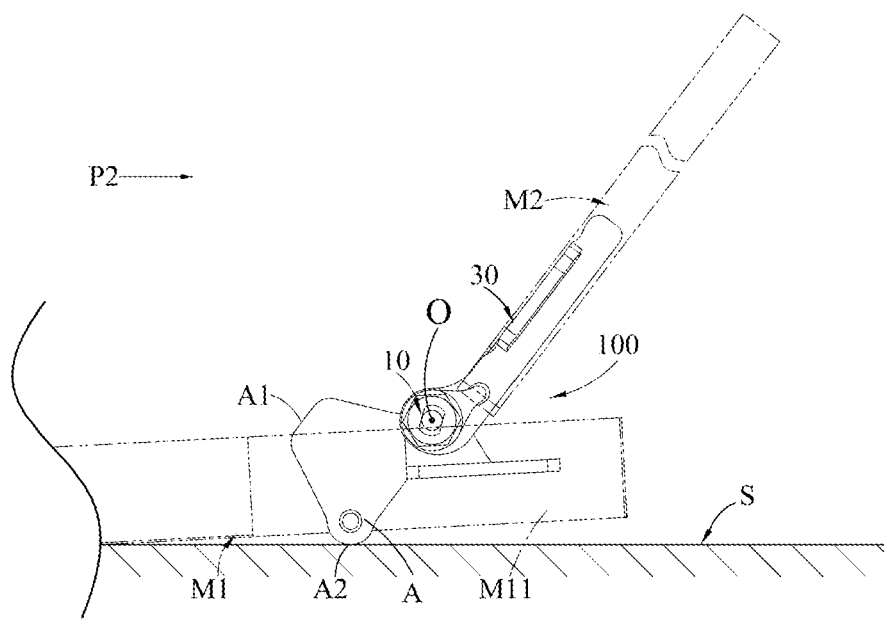
FIG. 4 is a use state diagram of an electronic device in an embodiment.
Figure 5:
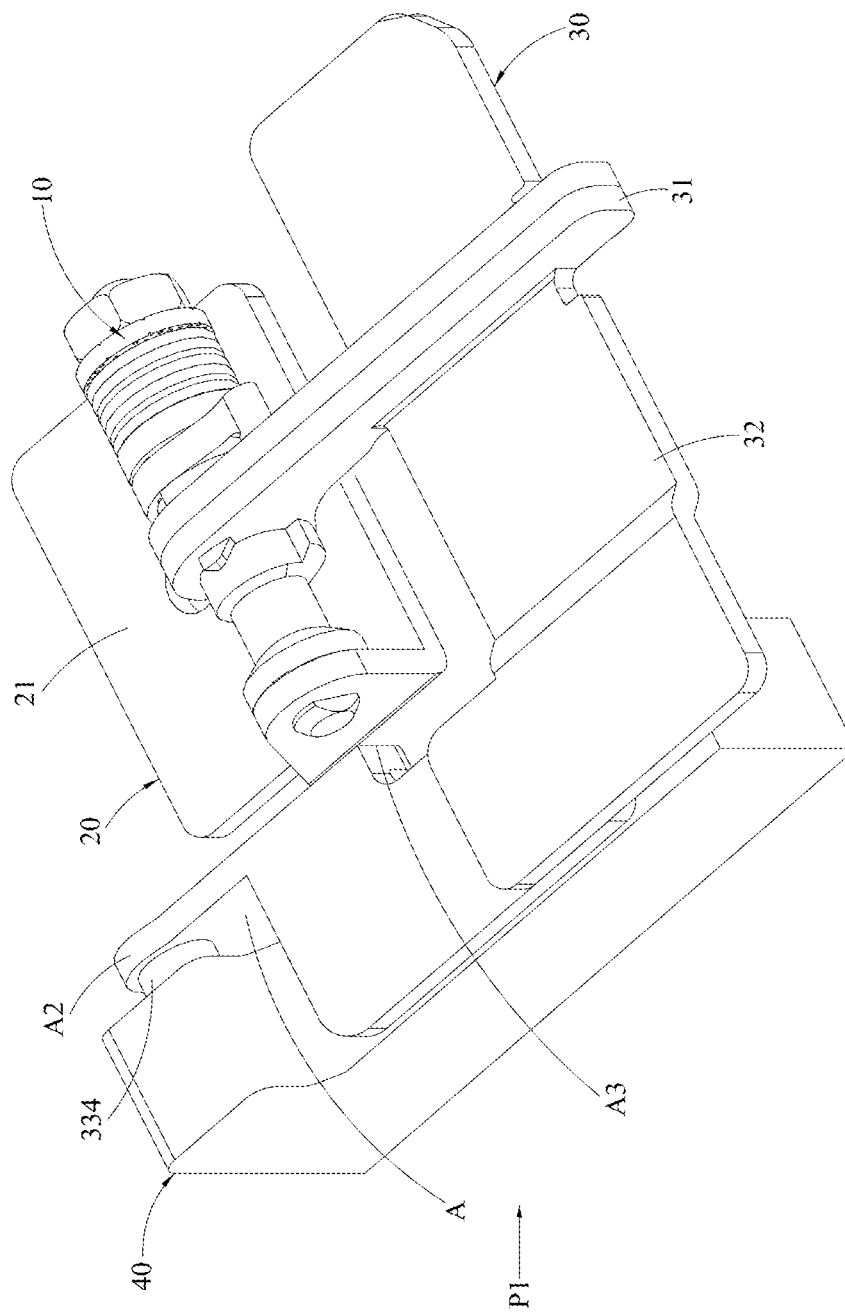
FIG. 5 is a three-dimensional appearance diagram showing a pivot structure in an embodiment.
Figure 6:
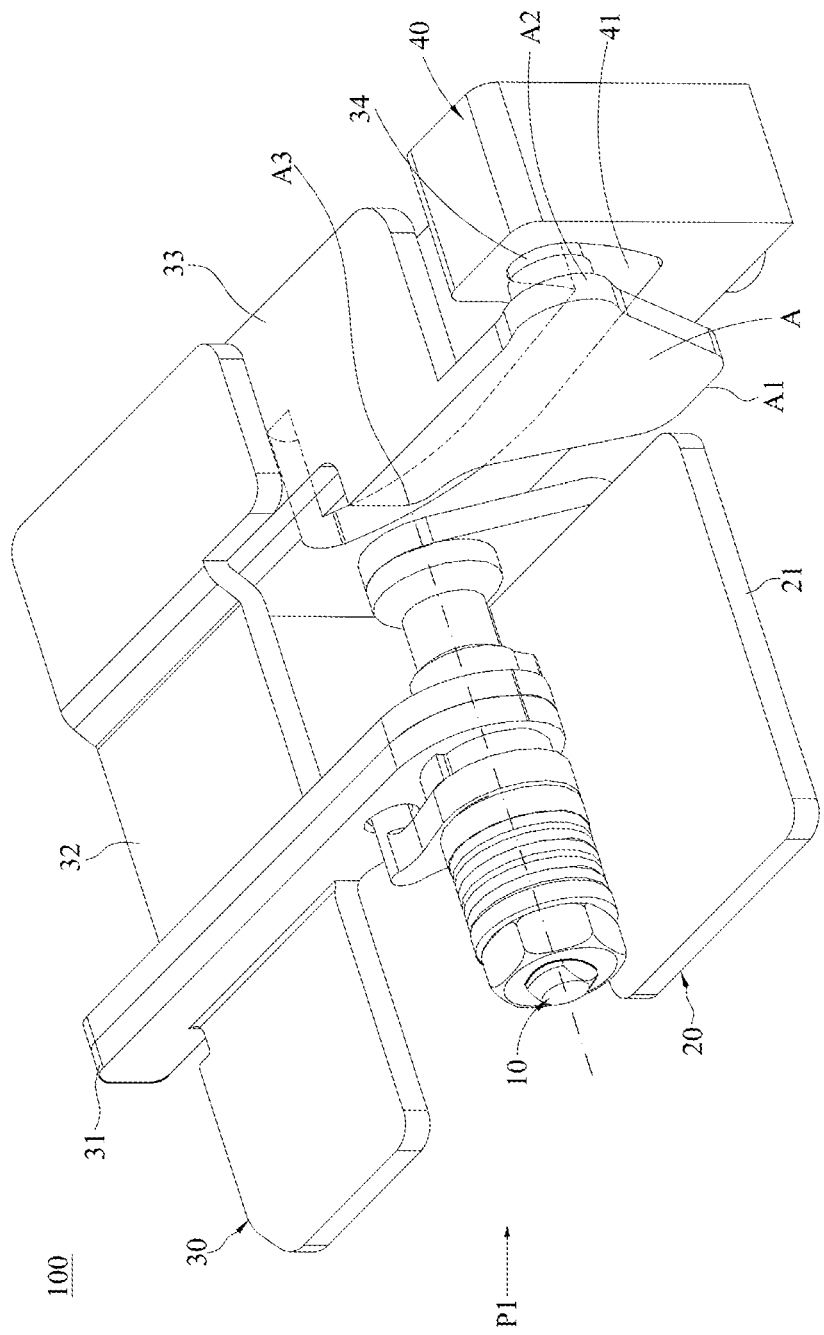
FIG. 6 is another perspective view of the appearance of FIG. 5 in an embodiment.
Figure 7:
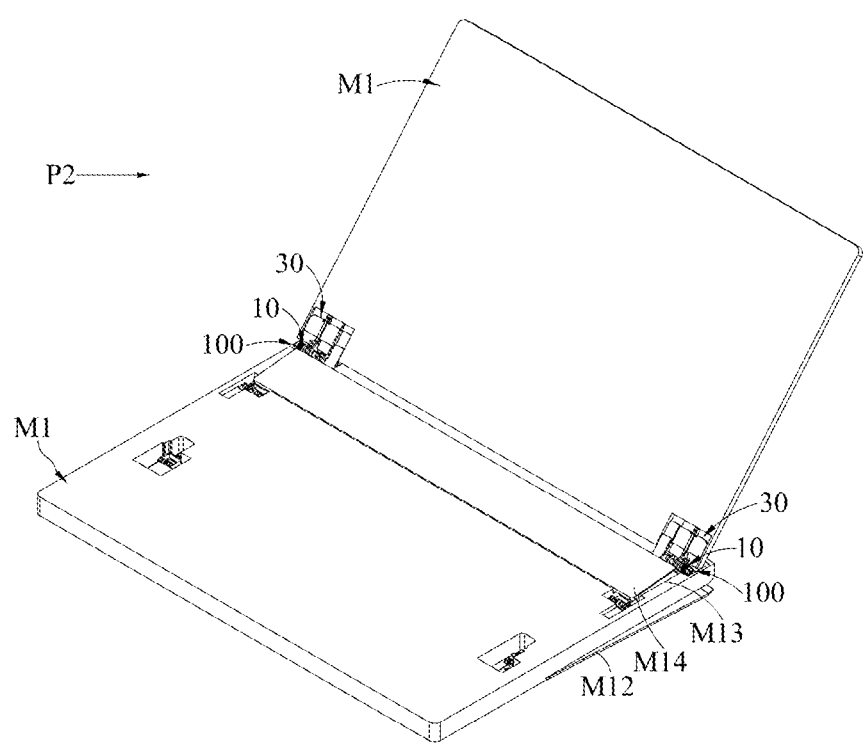
FIG. 7 is a three-dimensional external view of an electronic device in a second position of an embodiment.
Figure 8:
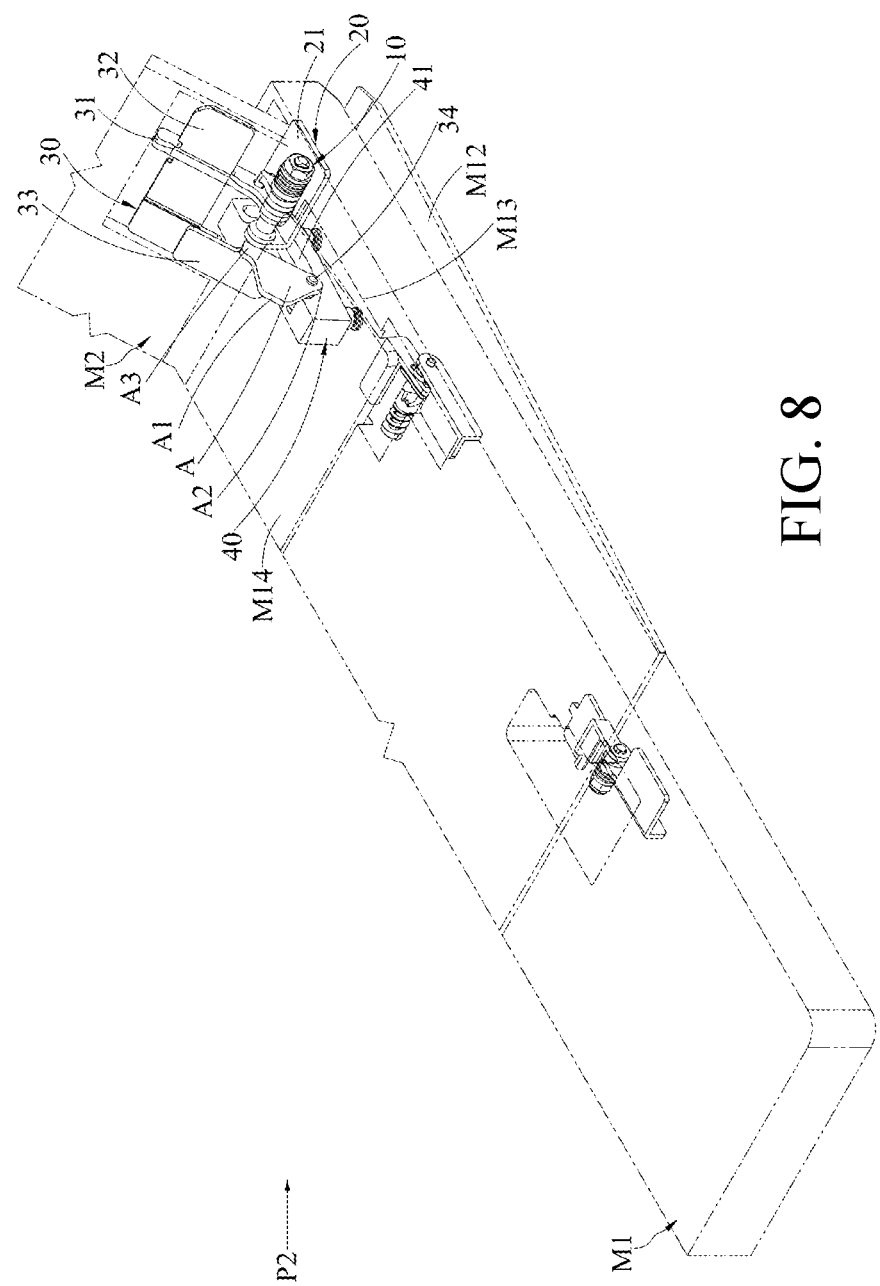
FIG. 8 is a cross-sectional view of a partial three-dimensional structure of an electronic device in a second position of another embodiment.
Figure 9:
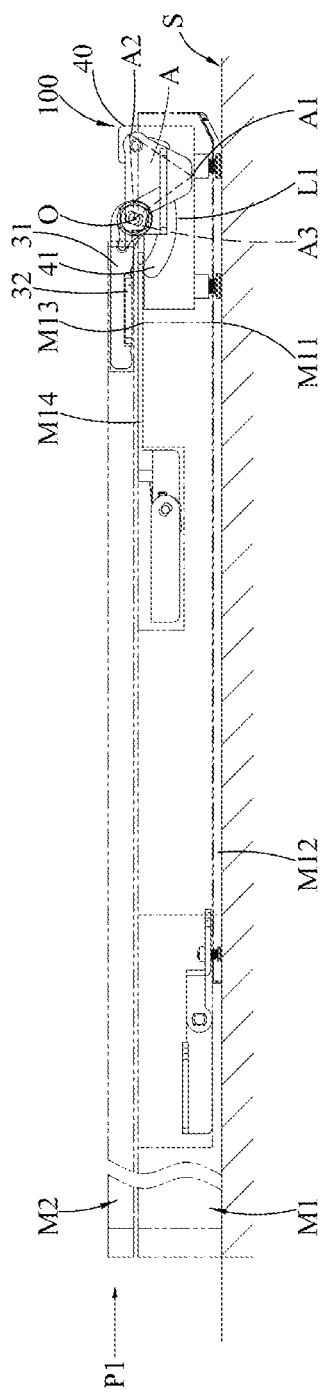
FIG. 9 is a side view of the electronic device in the first position of another embodiment.
Figure 10:
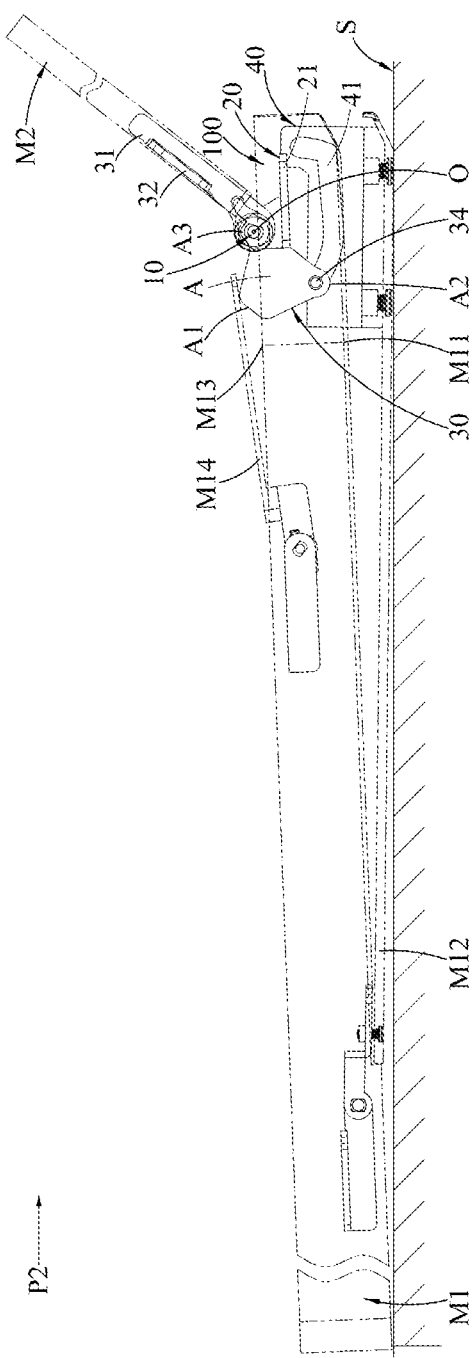
FIG. 10 is a side view of the electronic device in the second position in another embodiment.

Please refer to FIG. 2 to FIG. 4. FIG. 2 is a three-dimensional schematic diagram showing a pivot structure 100 of an electronic device in an embodiment; FIG. 3 is a side view showing an electronic device in an embodiment; FIG. 4 is a use state diagram of an electronic device in an embodiment.

Please refer to FIG. 2. The pivot structure 100 includes a shaft 10, a first assembling element 20, and a second assembling element 30. The shaft 10 includes an axis O.

The first assembling element 20 is assembled with the shaft 10 and used to connect with the first body M1. The second assembling element 30 is pivotally connected to the shaft 10 and used to connect the second body M2, and the second assembling element 30 includes an abutting portion A.

When at the first position P1, the abutting portion A and the first assembling element 20 are located on the same side relative to the axis O, and the bottom portion of the first body M1 is parallel to an abutting surface S. When at the second position P2, the abutting portion A rotates around the axis O and is located on a different side relative to the axis O from the first assembling element 20. The abutting portion A abuts the abutting surface S to generate an abutting force, which makes the first body M1 rise and generate an angle relative to the abutting surface S.

Please refer to FIG. 2 to FIG. 4. In one embodiment, the first assembling element 20 is fixedly connected to one end of the shaft 10. In the embodiment, the first assembling element 20 includes a plate-shaped first assembling portion 21 for connecting with the first body M1.

Please refer to FIG. 2 to FIG. 4. In one embodiment, the second assembling element 30 is pivotally connected to the shaft 10. In this embodiment, the second assembling element 30 includes a first extending segment 31, a second connecting portion 32, and a second extending segment 33 that are sequentially connected.

From the top view of FIG. 2, the first extending segment 31 extends in a direction perpendicular to the shaft 10. The second connecting portion 32 extends in a direction perpendicular to the first extending segment 31 and is parallel to the shaft 10. The second extending segment 33 extends in a direction perpendicular to the second connecting portion 32.

In one embodiment, the first extending segment 31, the second connecting portion 32, and the second extending segment 33 of the second assembling element 30 are integrated.

In the embodiment where the first extending segment 31, the second connecting portion 32, and the second extending segment 33 are not integrated. For the convenience, the length, shape or size of each separate member is designed for different shape of the first body M1 or the second body M2.

Referring to FIG. 2, in one embodiment, the second assembling element 30 is pivotally connected to the shaft 10 through one end of the first extending segment 31.

Referring to FIG. 2, in one embodiment, the second connecting portion 32 is connected to the other end of the first extending segment 31. In this embodiment, the second connecting portion 32 is a flat structure for connecting with the second body M2.

Referring to FIG. 2, in one embodiment, an end of the second extending segment 33 away from the second connecting portion 32 is the abutting portion A of the cam-shaped plane. The abutting portion A is perpendicular to the flat structure of the second connecting portion 32, which is not limited herein.

Please refer to FIG. 2 to FIG. 4. In one embodiment, the shape of the outer contour of the abutting portion A is a triangle. The outer contour of the abutting portion A includes three end points of a first abutting end A1, a second abutting end A2, and a fixing point end A3. Viewing from the extension direction perpendicular to the shaft 10 (that is, the view orientation of FIG. 3), the fixing point end A3 of the abutting portion A overlaps the axis O of the shaft 10, and the connection lines between the first abutting end A1, the second abutting end A2 and the fixing point end A3 is roughly formed a triangle.

Please refer to FIG. 3. At the first position P1, the abutting portion A and the first assembling element 20 are located at the same side relative to the axis O, and the abutting portion A does not contact or contacts the abutting surface S with the first abutting end A1, to make the bottom portion of the first body M1 be parallel to the abutting surface S. In the embodiment, the abutting portion A contacts the abutting surface S through the first abutting end A1, the first abutting end A1 is a plane to contact to the abutting surface S and not lift the first body M1.

Please refer to FIG. 3. In one embodiment, from the perspective of the direction perpendicular to the extension of the shaft 10, the shortest connection distance between the axis O of the shaft 10 and the first abutting end A1 is a first length L1, the shortest connection distance between the axis O of the shaft 10 and the second abutting end A2 is a second length L2, and the second length L2 is greater than the first length L1.

In this way, since the fixing point end A3 overlaps the axis O of the shaft 10, when the second connecting portion 32 rotates with the second body M2 to move to the second position P2, the fixing point end A3 is the same as the axis O of the shaft 10 and only rotates at the same position, and the first abutting end A1 and the second abutting end A2 of the abutting portion A rotate around the axis O of the shaft 10.

Therefore, the first abutting end A1 and the second abutting end A2 of the abutting portion A moves to the other side of the axis O, so that the first abutting end A1 and the second abutting end A2 of the abutting portion A are located on different sides relative to the axis O.

Refer to FIG. 1 to FIG. 4. FIG. 1 and FIG. 2 are the states of the pivot structure 100 in the first position P1 of an embodiment. When the pivot structure 100 is suitable for the electronic device and is located at the first position P1, the second body M2 is in a closed state close to the first body M1. FIG. 4 is the state of the pivot structure 100 at the second position P2 in an embodiment. When the pivot structure 100 is suitable for the electronic device and is located at the second position P2, the second body M2 is in an open state away from the first body M1.

Refer to FIG. 3 and FIG. 4. Based on the foregoing, when the second body M2 opens and closes relative to the first body M1, the second body M2 drives the second assembling element 30 to make the shaft 10 rotate. During the rotational displacement of the second assembling element 30, the abutting portion A of the second assembling element 30 abuts on the abutting surface S with the first abutting end A1 or the second abutting end A2. Therefore, based on the interaction between the second abutting end A2 and the abutting surface S, an angle is formed between the first body M1 and the abutting surface S.

In this way, when the angle exists between the first body M1 and the abutting surface S, a gap is formed between the abutting surface S and the first body M1 to dissipate heat, which prevents the first body M1 from overheating to affect its performance and improves the life of the first body M1. In addition to the pivot structure 100 providing the existing functions of pivoting the first body M1 and the second body M2, it further interacts with the first body M1 to make the electronic device have heat dissipation efficiency and does not affect the internal space configuration due to the heat dissipation efficiency.

It is worth noting that, in the embodiment, the interaction between the second assembling element 30 and the abutting surface S is specifically realized through changing the second abutting end A2 of the second assembling element 30 from a form that does not interact with the abutting surface S to a form that interacts with the abutting surface S to generate the abutting force to support the first body M1, which makes the first body M1 be inclined to the abutting surface S, and forms the angle relative to the abutting surface S.

In detail, at the first position P1, the second abutting end A2 of the second assembling element 30 directly or indirectly abuts the abutting surface S. When the second body M2 moves from the first position P1 to the second position P2, the second body M2 drives the second assembling element 30 to rotate, and the second assembling element 30 pivots with the shaft 10 around the rotation axis.

At this time, the second abutting end A2 of the second assembling element 30 rotates around the shaft 10. During this process, the second abutting end A2 rotates and moves approaching to the abutting surface S. As the second length L2 between the second part A2 and the axis O is greater than the first length L1 between the first abutting end A1 and the axis O, at the second position P2, the second abutting end A2 directly or indirectly abuts the abutting surface S.

When the second abutting end A2 abuts the abutting surface S, the second abutting end A2 exerts a force on the abutting surface S, and the abutting surface S also generates the abutting force relative to the second abutting end A2. Then, the abutting force is the reaction force produced by the abutting surface S relative to the second abutting end A2.

As the pivot structure 100 is disposed on the first body M1, the abutting force generated by the abutting surface S relative to the second assembling element 30 is equivalent to the force applied to the first body M1, and then the first body M1 is propped up to form the angle with the abutting surface S.

Please refer to FIG. 3 and FIG. 4. In an embodiment, a first opening M11 is provided at the position of the first body M1 facing the abutting surface S and corresponding to the pivot structure 100. In this embodiment, at the first position P1, the pivot structure 100 does not protrude from the side of the first body M1 facing the abutting surface S at all, and the first abutting end A1 of the second assembling element 30 of the pivot structure 100 faces the abutting surface S.

Please refer to FIG. 3 and FIG. 4. At the second position P2, the second assembling element 30 of the pivot structure 100 pivots with the second body M2 relative to the first body M1, and after the second assembling element 30 rotating, the second assembling element 30 becomes inclined relative to the abutting surface S.

Moreover, the second assembling element 30 is changed to the second abutting end A2 facing towards the abutting surface S after pivoted, and the second abutting end A2 extends from the first opening M11 of the first body M1 and abuts against the abutting surface S.

When the second assembling element 30 protrudes from the first opening M11, the second assembling element 30 props up the side of the first body M1 with the pivot structure 100, which makes a part of the first body M1 separate from the abutting surface S to generate a gap with the abutting surface S, and improves the heat dissipation effect.

Please refer to FIG. 7 to FIG. 10. In one embodiment, the first body M1 further includes a first cover M12, and the first cover M12 is pivoted to the first body M1 and is opened and closed relative to the first opening M11. At the first position P1, the first cover M12 is located at the position of covering the first opening M11.

Therefore, the electronic device maintains a complete appearance which achieves the dustproof effect. In this way, when located at the second position P2, the second abutting end A2 of the second assembling element 30 applies force on the first cover M12, keeping the first cover M12 away from the first opening M11 and supported by the abutting surface S. In this state, the first opening M11 is opened, so that the internal space of the first body M1 is connected to the outside through the first opening M11 to quickly dissipate heat.

Please refer to FIG. 5 to FIG. 10. In one embodiment, the pivot structure 100 further includes a guiding element 40 to guide the second assembling element 30 to rotate along a specific path. In this embodiment, the guiding element 40 is pivotally connected to the first body M1 and includes a guiding portion 41, and the second assembling element 30 is connected to the other end of the second body M2 and slidably disposed on the guiding portion 41.

In this way, when the second assembling element 30 rotates along with the second body M2, the other end of the second assembling element 30 connected with the second body M2 slips into the guiding portion 41 of the guiding element 40, and applies a force to the guiding element 40, which makes the guiding element 40 incline to support the first body M1 and the first body M1 is propped up to form a gap relative to the abutting surface S to achieve the effect of heat dissipation.

Please refer to FIG. 7 to FIG. 10. In the embodiment that the first body M1 includes the first cover M12, the guiding element 40 is fixed on the first cover M12 to form a pivot connection with the first body M1. In this embodiment, the guiding element 40 is a cubic structure, and the guiding portion 41 is a groove. The second assembling element 30 further includes a guiding rod 34, the guiding rod 34 is disposed in the abutting portion A of the second assembling element 30, and the guiding rod 34 of the second assembling element 30 is slidably disposed in the groove.

In this way, when the second assembling element 30 pivotally connected with the second body M2, the pivoting action of the second assembling element 30 drives the guiding rod 34. Then the guiding rod 34 is guided by the guiding portion 41 of the guiding element 40 and slips in the guiding portion 41 to move along a specific path. And, while the guiding rod 34 slips in the guiding portion 41, the guiding rod 34 applies force on the guiding portion 41, which makes the guiding element 40 drive the first cover M12 to pivot away from the first opening M11, and the first opening M11 becomes an open state to facilitate the heat dissipation of the first body M1.

It is worth noting that, in the foregoing embodiments, the guiding portion 41 of the guiding element 40 is a groove, and the second assembling element 30 is provided on the guiding portion 41 with the guiding rod 34. However, the guiding portion 41 and the structure matching the guiding portion 41 are not limited to this. It is also realized by setting the guiding portion 41 as a convex portion and setting the groove on the second assembling element 30 to match the convex portion in other embodiments.

Please refer to FIG. 7 to FIG. 10. In one embodiment, the first body M1 is further provided with a second cover M14. In this embodiment, the side of the first body M1 facing the second body M2 is provided with a second opening M13 connected to the inside of the first body M1. The second cover M14 is pivoted on the side of the first body M1 facing the second body M2, which is opened and closed relative to the second opening M13. At the first position P1, the second cover M14 is located at the position of covering the second opening M13.

Therefore, the electronic device maintains a complete appearance which achieves the dustproof effect. Moreover, when located at the second position P2, the first abutting end A1 of the second assembling element 30 protrudes from the second opening M13 and pushes against the second cover M14, which makes the second cover M14 move away from the second opening M13, the second opening M13 becomes open, so that the internal space of the first body M1 is connected to the outside through the first opening M11 and the second opening M13 at the same time, providing better heat dissipation effect.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
   a first body;
   a second body; and
   a pivot structure, independent from and disposed between the first body and the second body, to allow the first body and the second body to rotate relatively between the first position and the second position, the pivot structure comprises:
   a shaft, including an axis;
   a first assembling element, assembled with the shaft and connected with the first body, wherein the first assembling element includes a plate-shaped first assembling portion, the first assembling element is connected with the first body by the first assembling portion; and
   a second assembling element, pivotally connected to the shaft and connected with the second body, the second assembling element includes a first extending segment, a second connecting portion, and a second extending segment that are sequentially connected, the first extending segment is perpendicular to the second connecting portion, the second connecting portion is perpendicular connected to an end of the second extending segment, the other end of the second extending segment has an abutting portion, wherein the second connecting portion—is a—flat structure, the second assembling element is connected with the second body by the second connecting portion, the abutting portion is perpendicular to the flat structure of the second connecting portion;
   when at the first position, the abutting portion and the first assembling element are located on the same side relative to the axis, and a bottom portion of the first body is parallel to an abutting surface; when at the second position, the abutting portion rotates around the axis and is located on a different side relative to the axis from the first assembling element, and the abutting portion abuts the abutting surface to generate an abutting force, which makes the first body rise and generate an angle relative to the abutting surface.

2. The electronic device according to claim 1, wherein the first body includes an opening, when at the second position, the abutting portion protrudes from the first opening.

3. The electronic device according to claim 1, wherein the first extending segment is pivotally connected with the shaft.

4. The electronic device according to claim 1, wherein the abutting portion includes a first abutting end, a second abutting end, and a fixing point end, in an extending direction perpendicular to the shaft, the fixing point end overlaps an axis of the shaft, when at the second position, the second abutting end abuts the abutting surface.

5. The electronic device according to claim 4, wherein in the extension direction perpendicular to the shaft, the connecting lines of the fixing point end, the first abutting end, and the second abutting end is formed a triangle.

6. The electronic device according to claim 5, wherein in the extension direction perpendicular to the shaft, the shortest connection distance between the fixing point end and the first abutting end and between the fixing point end and the second abutting end are a first length and a second length respectively, the first length is less than the second length.

7. The electronic device according to claim 3, wherein the second connecting portion extends in a direction parallel to an extending direction of the shaft, and the first extending segment and the second extending segment extend in a direction perpendicular to an extending direction of the second connecting portion.

8. A pivot structure, suitable for an electronic device, the electronic device includes:
   a first body and a second body, the first body and the second body rotate between a first position and a second position through the pivot structure, the pivot structure independent from and disposed between the first body and the second body, the pivot structure comprising;
   a shaft, including an axis;
   a first assembling element, assembled with the shaft, wherein the first assembling element includes a plate-shaped first assembling portion for connecting with the first body; and
   a second assembling element, pivotally connected to the shaft, wherein the second assembling element includes a first extending segment, a second connecting portion, and a second extending segment that are sequentially connected, the first extending segment is perpendicular to the second connecting portion, the second connecting portion is perpendicular connected to an end of the second extending segment, the other end of the second extending segment has an abutting portion, the second connecting portion is a flat structure for connecting with the second body, the abutting portion is perpendicular to the flat structure of the second connecting portion; wherein,
   when at the first position, the abutting portion and the first assembling element are located on the same side relative to the axis, and a bottom portion of the first body is parallel to an abutting surface;
   when at the second position, the abutting portion rotates around the axis and is located on a different side relative to the axis from the first assembling element, and the abutting portion abuts the abutting surface to generate an abutting force, which makes the first body rise and generate an angle relative to the abutting surface.

9. The pivot structure according to claim 8, wherein the first extending segment is pivotally connected with the shaft.

10. The pivot structure according to claim 9, wherein the second connecting portion extends in a direction parallel to an extending direction of the shaft, and the first extending segment and the second extending segment extend in a direction perpendicular to an extending direction of the second connecting portion.

11. The pivot structure according to claim 10, wherein the abutting portion includes a first abutting end, a second abutting end, and a fixing point end, in an extending direction perpendicular to the shaft, the fixing point end overlaps an axis of the shaft, when at the second position, the second abutting end abuts the abutting surface.

\* \* \* \* \*